Figures 1, 1A:
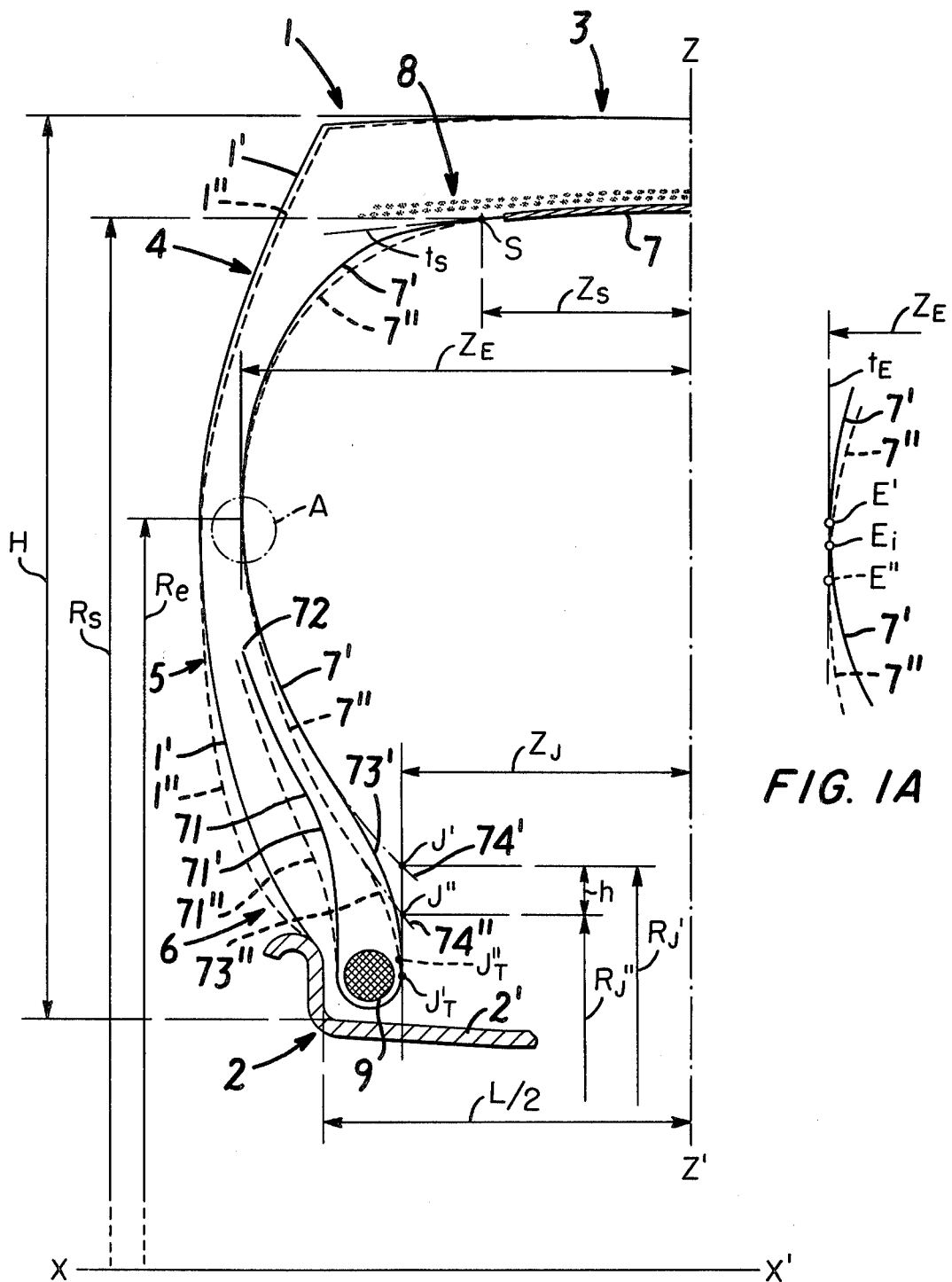

United States Patent [19]

Pommier

[11] Patent Number: 4,481,994
[45] Date of Patent: Nov. 13, 1984

[54] TIRE WITH PRESTRESSED RADIAL CARCASS REINFORCEMENT

[75] Inventor: Jean Pommier, Clermont-Ferrand, France

[73] Assignee: Compagnie Generale des Etablissements Michelin, Clermont-Ferrand, France

[21] Appl. No.: 473,129

[22] Filed: Mar. 7, 1983

Related U.S. Application Data

[63] Continuation of Ser. No. 281,976, Jul. 10, 1981, abandoned, which is a continuation of Ser. No. 100,829, Dec. 6, 1979, abandoned.

[30] Foreign Application Priority Data

Dec. 15, 1978 [FR] France .............................. 78 35731

[51] Int. Cl.³ .......................... B60C 3/00; B60C 9/18
[52] U.S. Cl. .......................... 152/353 R; 152/352 R; 152/356 R; 152/361 R
[58] Field of Search ........... 152/330 R, 352 R, 352 A, 152/353 R, 353 C, 353 G, 354–356, 361 R, 361 FP, 361 DM

[56] References Cited

U.S. PATENT DOCUMENTS

| | | | |
|---|---|---|---|
| 3,757,844 | 9/1973 | Verdier | 152/361 FP |
| 4,037,637 | 7/1977 | Arimura et al. | 152/352 R |
| 4,170,254 | 10/1979 | Jackson | 152/353 R |
| 4,345,634 | 8/1982 | Giron | 152/353 R |
| 4,387,758 | 6/1983 | Matsuda et al. | 152/352 R |
| 4,393,912 | 7/1983 | Gouttebessis | 152/352 R |
| 4,445,560 | 5/1984 | Musy | 152/353 C |

FOREIGN PATENT DOCUMENTS

2913949  10/1979  Fed. Rep. of Germany ... 152/352 R

Primary Examiner—Lois E. Boland
Attorney, Agent, or Firm—Brumbaugh, Graves, Donohue & Raymond

[57] ABSTRACT

In a tire with a prestressed radial carcass reinforcement, the mean meridian fibers (7', 7'') of the carcass reinforcement (7) of the tire, uninflated (1') and inflated (1'') to its service pressure, respectively, have a point of intersection ($E_i$) located between the points (E', E'') of these fibers (7' and 7'', respectively) at which they have a common tangent ($t_E$) perpendicular to the axis of rotation (XX') of the tire.

7 Claims, 2 Drawing Figures

TIRE WITH PRESTRESSED RADIAL CARCASS REINFORCEMENT

This is a continuation application of U.S. application Ser. No. 281,976, filed July 10, 1981, now abandoned, which in turn is a continuation application of U.S. application Ser. No. 100,829, filed Dec. 6, 1979, now abandoned.

The present invention relates to tires formed of a tread, two shoulders, two sidewalls and two beads and having a carcass reinforcement capped by a tread reinforcement, the carcass reinforcement consisting essentially of at least one ply of radial wires or cables anchored to at least one bead ring in each bead, the tread reinforcement consisting of at least two plys of wires or cables which are parallel to each other in each ply and crossed from one ply to the other.

Tires of the type defined above are customarily vulcanized in such a manner that the shape of the tire in the vulcanization mold is as close as possible to the shape which it assumes when it is mounted on its service rim, inflated to the service pressure, but not under load. In particular, it is attempted by the vulcanization to impart to the carcass reinforcement (or to the mean meridian fiber thereof when said carcass reinforcement is formed of several plys one above the other), an equilibrium meridian profile which corresponds to that which it assumes when the tire is mounted and inflated to its service pressure, but not under load. Preferably this equilibrium meridian profile upon inflation is the natural equilibrium meridian profile defined by the customary relationship $\cos \phi = (R^2 - R_e^2)/(R_s^2 - R_e^2)$, in which $\phi$ is the angle formed by the tangent to the mean meridian fiber at the point of said fiber having a radial distance R from the axis of rotation of the tire and a line parallel to said axis of rotation. $R_s$ is the radial distance of the point of the mean meridian fiber where the angle $\phi$ is 0 and $R_e$ is the radial distance of the point of the mean meridian fiber where the angle $\phi$ is equal to 90°, with respect to the axis of rotation of the tire.

When such a tire is inflated, initial stresses are produced in the different parts (beads, sidewalls, shoulders, tread) of the tire under the effect of the inflation pressure. Service stresses superimpose themselves on the initial stresses when the tire is traveling. This superimposing of stresses may cause a lack of endurance of the tire and its premature failure.

The harmful stresses which the invention proposes remedying are in particular the following. Excessive tensions in the outer rubber of the zone of the shoulders of the tire may give rise to fatigue breaks. These tensions may also cause the propagation of cuts caused by travel on aggressive soils.

Substantial compressions of the elements which form the anchoring of the carcass reinforcement, particularly the portion thereof which is turned upward around the bead ring, reach their maximum in the vicinity of the zones where the tire rests on the rim flanges and may result in the destruction of one or more of these elements and therefore the premature end of the life of the tire.

The basic idea of the invention consists in imparting to the tire, and more particularly its radial carcass reinforcement, a shape such that, when mounted on its service rim but without inflation pressure or load, the deformations due to inflation to service pressure produce initial compressive stresses in the rubber of the shoulders and initial tensile stresses at the level of the upward-turned portions of the radial carcass reinforcement in the beads; the shape of the tire mounted on its service rim, not inflated and not under load, being imparted to it in the vulcanization mold.

Accordingly, the tire of the type considered is characterized, in accordance with the invention, by the fact that, the tire being considered in radial cross-section, mounted on its service rim and not under load, (a) the mean meridian fiber of the carcass reinforcement of the uninflated tire and the mean meridian fiber of the carcass reinforcement of the tire inflated to its service pressure have a point of intersection which is located between a point of the mean meridian fiber of the carcass reinforcement of the uninflated tire and a point of the mean meridian fiber of the carcass reinforcement of the inflated tire at which said points the mean meridian fibers have a common tangent perpendicular to the axis of rotation of the tire, (b) the mean meridian fiber of the carcass reinforcement of the uninflated tire has an upper segment, contained between the point where the carcass reinforcement becomes parallel to the tread reinforcement and said point of intersection, which is located radially and axially outward of a corresponding upper segment of the mean meridian fiber of the carcass reinforcement of the inflated tire, and (c) the mean meridian fiber of the carcass reinforcement of the uninflated tire has a lower segment, contained between said point of intersection and the point where the carcass reinforcement becomes parallel to the bead ring, which is located radially outward and axially inward of a corresponding lower segment of the mean meridian fiber of the carcass reinforcement of the inflated tire.

It is advantageous to use an inextensible carcass reinforcement, at least between the point where it becomes parallel to the tread reinforcement and the point where it becomes parallel to the bead ring.

The inextensibility of the carcass reinforcement is such that, when subjected to a tensile force equal to 10% of its ultimate tensile strength, the carcass reinforcement experiences a relative elongation of less than 0.5% and preferably less than 0.2%. There is preferably employed a carcass reinforcement formed essentially of a single ply of steel cables which satisfies the above definition of inextensibility.

The means of imparting to the tire of the present invention, and more particularly to its radial carcass reinforcement, the shape corresponding to the tire mounted on its service rim, not under load and not inflated, consists in vulcanizing the tire in a vulcanization mold which corresponds to said shape. The rim on which the vulcanization of the tire is effected corresponds preferably to the service rim for which the tire is intended.

However, the tire of the invention can be vulcanized on a rim of a width (such as defined by the standards in use) less than the width of the service rim. In this way, the initial compressive stresses at the shoulders and the initial tensile stresses at the beads are increased.

One preferred method of maintaining the shape imparted to the tire, and in particular to its carcass reinforcement, by the vulcanization is to anchor the carcass reinforcement to the bead ring by means of an upward-turned portion whose end is located at a radial distance from the axis of rotation of the tire of between 10% and 60% of the radial height of the tire on its service rim, and radially outward from the bead ring.

In order to define the trace of the mean meridian fiber of the carcass reinforcement of the tire of the invention which corresponds to the two conditions of uninflated and inflated to service pressure, the above-mentioned equation is used, namely: $\cos \phi = (R^2 - R_e^2)/(R_s^2 - R_e^2)$.

This equation defines the natural equilibrium profiles of the carcass reinforcement for the two conditions of inflated and uninflated, as explained by means of an illustrative embodiment of the invention which will be described below with reference to the drawing.

In the drawing, FIG. 1 is a schematic radial half-section through a tire in accordance with the invention, and FIG. 1A is an enlarged view taken on the circle A in FIG. 1.

The tire 1 is mounted on an ordinary rim 2, referred to as the service rim, which has a quasi-cylindrical bead seat 2' (conicity of about 5°). The half-width of the rim 2 with respect to the trace ZZ' of the equatorial plane of the tire, as contemplated by the standards in use, is equal to the quantity L/2.

The tire 1 is formed of a tread 3, two shoulders 4, two sidewalls 5, and two beads 6 which are seated on the rim 2; its inner wall has not been shown in the drawing.

The uninflated tire 1' not under load is shown in solid line, that is to say the tire as vulcanized. The tire 1'' inflated to its service pressure and not under load is shown in dashed line. The service pressure is the rated pressure contemplated by the standards in use or by the manufacturer.

The mean meridian fiber of the carcass reinforcement 7 follows the trace 7' in the case of the uninflated tire 1' and the trace 7'' in the case of the tire 1'' when inflated to its service pressure. In the example selected, the carcass reinforcement 7 is formed of a ply of steel cables which is continuous from one bead 6 to the other and is partially shown in the tread 3.

The tread reinforcement is symbolically indicated by a block 8 the meridian curvature of which is less than that of the carcass reinforcement 7 arranged radially inward of the tread reinforcement 8.

In FIG. 1 (not drawn to scale), the axis of rotation of the tire 1 is symbolically indicated by the straight line XX' perpendicular to the trace ZZ' of the equatorial plane of the tire on the plane of the drawing.

In the tires of the type described, it can be assumed that the tread reinforcement 8 is practically non-deformable under the effect of the inflation pressure.

Thus, at point S where the carcass reinforcement 7 becomes parallel to the tread reinforcement 8, the mean meridian fibers corresponding to the two traces 7' and 7'' merge practically beneath the tread reinforcement 8 and are located at a radial distance $R_s$ from the axis of rotation XX' of the tire and at an axial distance $Z_s$ from the trace ZZ' of the equatorial plane of the tire. At this distance $R_s$ the mean meridian fibers also have practically merged tangents $t_s$ parallel to the axis of rotation XX' of the tire or tangents which form a very small angle with said axis.

In accordance with one of the features of the invention, the points E' and E'', where the mean meridian fibers 7' and 7'', respectively, have a common tangent $t_E$ (See FIG. 1A) which is perpendicular to the axis of rotation XX' of the tire, are located at a distance $Z_E$ from the trace ZZ' of the equatorial plane of the tire. For the sake of greater clarity, the points E' and E'' which are located in the Circle A of FIG. 1 have been shown on an enlarged scale in FIG. 1A.

The carcass reinforcement 7 is anchored to the bead ring 9 of the bead 6 by a portion 71 which is turned upward towards the outside. The end 72 of the portion 71 is arranged at a radial distance from the axis of rotation of the tire close to 40% to 50% of the radial height H of the tire on its service rim 2 and radially outward from the bead ring 9.

In this example, on the one hand, the traces 7' and 7'' of the mean meridian fibers are connected in the zone of the bead 6 as customary by arcs 73' and 73'', respectively, of a curvature opposite that of the traces 7' and 7'' to the points $J'_T$ and $J''_T$, respectively, where the carcass reinforcement 7 contacts the bead ring 9 in uninflated condition and when inflated to service pressure, respectively. Furthermore, the extensions 74' and 74'' of the equilibrium meridian profiles 7' and 7'' terminate at the points J' and J'', respectively, each located at an axial distance $Z_J$ from the trace ZZ' of the equatorial plane of the tire, the point J' being at a radial distance $R_J$, and the point J'' at a radial distance $R_{J''}$ such that $R_J$ is greater than $R_{J''}$, from the axis of rotation XX' of the tire.

The basic principle of the invention implies that the lengths of the mean meridian fibers 7' and 7'' of the carcass reinforcement 7 in uninflated condition and when inflated, respectively, are identical within about 1% between the point S where the carcass reinforcement 7 becomes parallel to the tread reinforcement 8 and the points $J'_T$ and $J''_T$, respectively, where the carcass reinforcement becomes parallel to the bead ring 9. This should be taken into account in connection with the traces of the connecting arcs 73' and 73'', respectively.

In certain cases, particularly when using the standardized, so-called conical-seat rims (inclination of about 15° with respect to the axis of rotation of the tire), the mean meridian fiber 7'' of the carcass reinforcement 7 in inflated condition may be without inversion of curvature (and therefore without connecting arc 73'') between the point E'' and the point $J''_T$ where the carcass reinforcement 7 becomes parallel to the bead ring 9. Then the points J'' and $J''_T$ are located at the same radial distance $R_{J''}$ from the axis of rotation of the tire and the radial distance h is defined from the radius $R_{J''}$.

Thus, in accordance with the invention, on the one hand, the mean meridian fiber 7' (tire uninflated) has an upper segment which is located radially and axially outward of the corresponding upper segment of the mean meridian fiber 7'' (tire inflated) between the point S and the point of intersection $E_i$ (FIG. 1A) of the two fibers 7' and 7'', the point $E_i$ being located in the zone between the points E' and E'' corresponding to the mean meridian fiber 7' and the mean meridian fiber 7'', respectively; on the other hand, the mean meridian fiber 7' (tire uninflated) has a lower segment which is located radially outward and axially inward of the corresponding lower segment of the mean meridian fiber 7'' (tire inflated) between the said point of intersection $E_i$ and the point $J'_T$ where the carcass reinforcement 7 becomes parallel to the bead ring 9.

Experience shows that it is advantageous to select the radial distance $h = R_J - R_{J''}$ equal to between 2% and 20% of the height H (as defined by the standards in use) of the tire on its service rim. The relative value of the radial distance h characterizes the amount of prestress of the tire 1″ (in dashed line) of the invention when inflated to the service pressure.

As can be noted from FIG. 1, on the one hand, in the region of the shoulders 4 the outer surface of the inflated tire 1″ is both axially and radially inward of the outer surface of the uninflated tire 1′ subjected to zero pressure; on the other hand, in the region of the points E′ and E″, the outer surface of the tire 1 is substantially at the same distance from the trace ZZ′ of the equatorial plane of the tire. Finally, in the region located radially inward of these points, the outer surface of the inflated tire 7″ is radially inward and axially outward of the outer surface of the uninflated tire 7′. The same is true of the upward-turned portion 71 which is displaced from the position 71′ to the position 71″ by the inflation pressure.

Thus, the shoulders 4 are initially placed in compression and the components of the zone of the beads 6, in particular the upward-turned portion 71, are initially placed in extension when the mounted tire 1′ is inflated to its service pressure.

Taking into account the amount of prestress characterized by the radial distance $h = R_{J'} - R_{J''}$, the trace of the two mean meridian fibers 7″ and 7′ of the carcass reinforcement 7 is established on the basis of the parametric relationship $\cos \phi = (R^2 - R_e^2)/(R_s^2 - R_e^2)$.

First of all, the trace 7″ (inflated condition) is defined by the points S ($R_s$, $Z_s$), J″ ($R_{J''}$, $Z_J$) and the distance $Z_E$ of the point E″. Then the trace 7′ is defined by the points S ($R_s$, $Z_s$), J′ ($R_{J'}$, $Z_J$) and the distance $Z_E$ of the point E′.

What is claimed is:

1. A tire formed of a tread, two shoulders, two sidewalls and two beads and having a carcass reinforcement capped by a tread reinforcement, the carcass reinforcement consisting essentially of at least one ply of radial wires or cables anchored to at least on bead ring in each bead, the tread reinforcement consisting of at least two plys of wires or cables which are parallel to each other in each ply and crossed from one ply to the other, the tire being characterized by the fact that, the tire being considered in radial cross-section, mounted on its service rim and not under load, (a) the mean meridian fiber of the carcass reinforcement of the uninflated tire and the mean meridian fiber of the carcass reinforcement of the tire inflated to its service pressure have a point of intersection ($E_i$) which is located between a point (E′) of the mean meridian fiber of the carcass reinforcement of the uninflated tire and a point (E″) of the mean meridian fiber of the carcass reinforcement of the inflated tire at which said points (E′, E″) the mean meridian fibers have a common tangent perpendicular to the axis of rotation of the tire,
   (b) the mean meridian fiber of the carcass reinforcement of the uninflated tire has an upper segment, contained between the point (S) where the carcass reinforcement becomes parallel to the tread reinforcement and said point of intersection ($E_i$), which is located radially and axially outward of a corresponding upper segment of the mean meridian fiber of the carcass reinforcement of the inflated tire,
   (c) the mean meridian fiber of the carcass reinforcement of the uninflated tire has a lower segment, contained between said point of intersection ($E_i$) and the point ($J'_T$) where the carcass reinforcement becomes parallel to the bead ring, which is located radially outward and axially inward of a corresponding lower segment of the mean meridian fiber of the carcass reinforcement of the inflated tire,
   (d) the mean meridian fiber of the carcass reinforcement follows traces defined by the relationship $\cos \phi = (R^2 - R_e^2)/(R_s^2 - R_e^2)$, at least between the point (S) where the carcass reinforcement becomes parallel to the tread reinforcement and the zone of the bead, the traces of the mean meridian fiber of the uninflated tire and of the tire inflated to its service pressure having, on the one hand, in common the point (S) where the carcass reinforcement becomes parallel to the tread reinforcement, these traces being furthermore located at the same axial distance from the equatorial plane of the tire to said points (E′, E″) where they have a common tangent perpendicular to the axis of rotation of the tire, and these traces or their extensions furthermore passing into the zone of the bead via points (J′, J″) located at the same axial distance from the equatorial plane of the tire but at a radial distance from the axis of rotation of the tire, with respect to the point (J″) corresponding to the mean meridian fiber of the tire inflated to its service pressure, which is less than the radial distance of the point (J′) corresponding to the mean meridian fiber of the uninflated tire; said terms $\phi$, R, $R_e$ and $R_s$ being as defined in the foregoing specification,
   (e) the difference in the radial distances from the axis of rotation of the tire to the points (J′, J″) of the traces or of the extensions of the traces of the mean meridian fibers, which are located at the same axial distance from the equatorial plane of the tire, in the zone of the bead, is between 2% and 20% of the height of the tire on its service rim,
   (f) the shape of the tire, and more particularly the shape of its carcass reinforcement, mounted on its service rim, not inflated and not under load, is obtained by vulcanizing the tire on a rim of a width equal to or less than the width of its service rim in a vulcanization mold corresponding to said shape,
   (g) the carcass reinforcement, at least between the point (S) where it becomes parallel to the tread reinforcement and the point ($J'_T$) where it becomes parallel to the bead ring, has a relative elongation of less than 0.5%, and preferably less than 0.2%, under a tensile force equal to 10% of its ultimate tensil strength, and
   (h) the length of the mean meridian fiber of the carcass reinforcement of the uninflated tire and the length of the mean meridian fiber of the carcass reinforcement of the inflated tire differ from each other by at most 1%, at least between the point (S) where the carcass reinforcement becomes parallel to the tread reinforcement and points ($J'_T$) and ($J''_T$), respectively, where the carcass reinforcement becomes parallel to the bead ring.

2. The tire according to claim 1, characterized by the fact that said points (E′, E″) of said mean meridian fibers have a common tangent located at the same axial distance from the equatorial plane of the tire.

3. The tire according to claim 1, characterized by the fact that the carcass reinforcement is essentially formed of a single ply of steel cables.

4. The tire according to claim 1, characterized by the fact that the carcass reinforcement is anchored to the bead ring by means of an upward-turned portion whose end is located at a radial distance from the axis of rotation of the tire of between 10% and 60% of the radial height of the tire on its service rim, and radially outward of the bead ring.

5. The tire according to claim 1, characterized by the fact that the tire is intended to be mounted on a service rim having quasi-cylindrical bead seats.

6. The tire according to claim 1, characterized by the fact that the tire is intended to be mounted on a service rim having frustoconical bead seats inclined about 15° with respect to the axis of rotation of the tire.

7. The tire according to claim 1, characterized by the fact that the tire is vulcanized on a rim of a width less than the width of its service rim.

* * * * *